(12) United States Patent
Rosso et al.

(10) Patent No.: US 11,705,734 B2
(45) Date of Patent: Jul. 18, 2023

(54) WIND FARM COMPRISING A STABILIZATION DEVICE AND A STABILIZATION DEVICE

(71) Applicant: Wobben Properties GmbH, Aurich (DE)

(72) Inventors: Roberto Rosso, Aurich (DE); Sönke Engelken, Bremen (DE); Marco Liserre, Kiel (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/276,058

(22) PCT Filed: Aug. 22, 2019

(86) PCT No.: PCT/EP2019/072490
§ 371 (c)(1),
(2) Date: Mar. 12, 2021

(87) PCT Pub. No.: WO2020/052937
PCT Pub. Date: Mar. 19, 2020

(65) Prior Publication Data
US 2022/0045517 A1 Feb. 10, 2022

(30) Foreign Application Priority Data
Sep. 14, 2018 (DE) .................... 10 2018 122 586.5

(51) Int. Cl.
*H02J 3/38* (2006.01)
*H02J 3/32* (2006.01)
*H02J 3/46* (2006.01)

(52) U.S. Cl.
CPC ............... *H02J 3/381* (2013.01); *H02J 3/32* (2013.01); *H02J 3/46* (2013.01); *H02J 2300/28* (2020.01)

(58) Field of Classification Search
CPC .... H02J 3/32; H02J 3/381; H02J 3/382; H02J 3/386; H02J 3/46; H02J 2300/28
(Continued)

(56) References Cited

U.S. PATENT DOCUMENTS 8,310,095 B2 * 11/2012 Angquist ............... H02J 9/062
307/45
2010/0237834 A1 * 9/2010 Alonso Sadaba ....... H02J 3/381
323/205

(Continued)

FOREIGN PATENT DOCUMENTS

| DE | 102006047792 A1 | 4/2008 |
| DE | 102014016664 A1 | 5/2016 |
| DE | 102016124602 A1 | 6/2018 |

OTHER PUBLICATIONS

Li et al., "Analysis and Design of Virtual Synchronous Machine Based STATCOM Controller", IEEE 15th Workshop on Control and Modeling for Power, Jun. 2014, pp. 1-6.

*Primary Examiner* — Hal Kaplan
(74) *Attorney, Agent, or Firm* — Seed IP Law Group LLP

(57) ABSTRACT

A wind farm, having a nominal power, for feeding electrical power into a supply network, comprising: wind power installations, a wind farm network and a stabilization unit connected to the wind farm network and arranged between the installations and the supply network. The stabilization unit increases a stability of the wind farm and comprises: an energy storage device which is set up to provide an electrical power, an intermediate circuit which is connected to the storage device and which is set up to conduct at least the electrical power provided by the storage device, an inverter connected to the intermediate circuit and set up to form at least the electrical power provided by the storage device, and a control unit set up to control at least the inverter such that the stabilization unit at the wind farm appears, statically as (Continued)

well as dynamically, like an electromechanical synchronous machine.

17 Claims, 2 Drawing Sheets

(58) Field of Classification Search
USPC .......................................................... 307/84
See application file for complete search history.

(56) References Cited

U.S. PATENT DOCUMENTS

| | | |
|---|---|---|
| 2010/0256970 A1 | 10/2010 | Heese et al. |
| 2012/0292904 A1 | 11/2012 | Tarnowski |
| 2017/0240050 A1* | 8/2017 | Oya .................... H01M 16/006 |
| 2017/0250540 A1 | 8/2017 | Varma |

* cited by examiner

WIND FARM COMPRISING A STABILIZATION DEVICE AND A STABILIZATION DEVICE

BACKGROUND

Technical Field

The present invention relates to a wind farm having a stabilization device, as well as such a stabilization device.

Description of the Related Art

Wind farms usually have a plurality of wind power installations which are connected to one another via a common wind farm network.

In order to feed electrical power generated by means of the wind power installations into an electrical supply network, the wind farm network is usually further connected to the electrical supply network at a network connection point by means of a connecting line and a transformer.

Furthermore, for generating the electrical power itself, the wind power installations usually have converters which are in most cases designed in a current impressing manner.

This results in special synchronizing units being required for network identification, in particular in order to be able to operate the converters properly, in particular in a synchronized manner, with or on the electrical supply network.

However, synchronizing units of this type can compromise the stability of the converter and thus the stability of the electrical supply network, in particular if the synchronizing units of different converters influence one another or swing up one another.

In particular at weak network connection points, i.e., network connection points with a low short circuit power, a swinging up of this type of the synchronizing units can result in the wind farm not being able to operate in a stable manner on the electrical supply network or the electrical supply network destabilizing and therefore having to be removed from the grid.

In the priority application for the present application, the German Patent and Trademark Office has researched the following prior art: DE 10 2016 124 602 A1, DE 10 2006 047 792 A1 and DE 10 2014 016 664 A1.

BRIEF SUMMARY

Provided are techniques for improving the stability of a wind farm which is connected to a weak network connection point, i.e., which has a low short circuit power (short circuit ratio (SCR)), for example less than 10.

A wind farm for feeding electrical power into an electrical supply network is thus proposed.

A wind farm is thus proposed which has a wind farm nominal power and is set up to feed electrical power into an electrical supply network.

For this purpose, the wind farm comprises a plurality of wind power installations, an electrical wind farm network which connects the plurality of wind power installations, which wind farm network is connected to the electrical supply network at a network connection point by means of a wind farm transformer, and a stabilization unit (device) which is connected to the wind farm network and is arranged between the plurality of wind power installations and the electrical supply network, in particular in order to increase the stability of the wind farm.

For this purpose, the stabilization unit can be connected to the wind farm network or the connecting line between the wind farm transformer and the network connection point, for example. Provided that the stabilization unit is arranged between the wind farm transformer and the network connection point, for example, the stabilization unit can emulate a synchronous machine particularly well, in particular at wind farm level. In the event that the stabilization unit is arranged in the wind farm network, the stability can be further improved at wind power installation level.

For this purpose, the stabilization unit itself comprises at least one electrical energy storage device (battery) which is set up to provide an electrical power, a direct voltage intermediate circuit which is connected to the electrical energy storage device and which is set up to conduct at least the electrical power provided by the electrical energy storage device, an inverter which is connected to the direct voltage intermediate circuit and which is set up to form at least the electrical power provided by the electrical storage device via the direct voltage intermediate circuit, and a control unit (controller) which is set up to control at least the inverter in such a way that the stabilization unit at the wind farm appears, statically as well as dynamically, like an electromechanical synchronous machine.

For this purpose, the electrical storage device can be designed as an electrical battery or comprise a plurality of capacitor banks, for example. In this case, the size of the electrical storage device is preferably selected according to the wind farm nominal power, namely in particular in such a way that the stabilization unit is set up to perform the functions described previously or hereinafter in such a way as to stabilize the wind farm.

In a preferred embodiment, the electrical storage device is additionally set up to extract electrical power from the electrical supply network or the wind farm network by means of the further components of the stabilization unit, in order to charge the electrical storage device and/or to feed electrical power into the electrical supply network or the wind farm network, preferably in a voltage impressing manner, in order to stabilize the wind farm.

In a preferred embodiment, the direct voltage intermediate circuit is further set up to also extract electrical power from the electrical supply network or the wind farm network, in particular in order to charge the electrical storage device.

In a further preferred embodiment, the direct voltage intermediate circuit additionally has a filter, for example an LCL filter, which is set up to smooth voltage harmonics in the direct voltage intermediate circuit.

In addition, the inverter is preferably designed as a full converter. This means that the inverter is set up to extract electrical power from the direct voltage circuit and to feed it into the electrical supply network or the wind farm network as well as to extract electrical power from the electrical supply network or the wind farm network and to feed it into the direct voltage intermediate circuit, in particular in order to charge the electrical storage device.

Furthermore, the control unit is preferably also set up to detect at least one charge state of the electrical storage device, in order to take it into account for the control of the inverter.

In a further preferred embodiment, various operating modes are stored in the control unit, the activation of which operating modes depend on the charge state of the electrical storage device. For example, operating modes are not carried out if the charge state of the electrical storage device is less than 20 percent. This has the advantage that predetermined capacities of the electrical storage device can be reserved for specific operating modes. For example, 20 percent is reserved for the operating mode: network faults. In this case, the stabilization unit is set up to supply to a network fault at any time, in order to identify the fault location in the electrical supply network.

In a further preferred embodiment, the control unit is further set up to control a DC-DC converter arranged in the direct voltage intermediate circuit.

Furthermore, it is proposed in particular that the stabilization unit is operated like a virtual synchronous machine.

It is proposed in particular that a battery-powered virtual synchronous machine is operated parallel to the wind farm in a voltage impressing manner, in order to increase the stability of the wind farm.

The stabilization unit preferably operates in a substantially voltage impressing manner.

It is thus proposed in particular that the inverter of the stabilization unit is operated with a voltage impressing control method, in particular in such a way that the stabilization unit specifies a stable voltage for the wind farm at its output.

In a preferred embodiment, the inverter is further set up to operate in a voltage impressing manner.

The inverter can therefore also be referred to as a voltage impressing inverter.

A voltage impressing inverter can provide a voltage even in no-load operation or feed in without current/power. As a result, a network angle can be provided, in particular for current impressing wind power installations, which in particular makes it possible to provide a correct phase position. In a preferred embodiment, the voltage impressing inverter or the stabilization unit does not have a synchronizing unit.

The stabilization unit preferably further comprises a DC-DC converter which is arranged between the electrical storage device and the direct voltage intermediate circuit.

In this case, it is particularly advantageous that the electrical storage device is, in particular galvanically, decoupled from the electrical supply network or from the wind farm network.

It is therefore possible to charge or to discharge the electrical storage device, regardless of the operating state of the electrical supply network or the wind farm network, for example.

The stabilization unit is preferably arranged at the network connection point, preferably between the wind farm transformer and the electrical supply network.

The stabilization unit is therefore preferably arranged in particular near the network connection point and not within the wind farm network. The wind farm and the stabilization unit thus form a functional unit.

Furthermore the stabilization unit preferably has a transformer which is arranged at an output of the inverter, in order to transform the voltage of the power provided.

The stabilization unit therefore also comprises a transformer which is set up to connect the stabilization unit to the wind farm network and/or the electrical supply network.

In this case, the stabilization unit and the transformer preferably form a functional unit. In particular, this means that the stabilization unit and this transformer can be set up to be locally separated from one another.

In a particularly preferred embodiment, the stabilization unit and the transformer are installed in a container.

In this case, it is particularly advantageous that the stabilization unit can be retrofitted in pre-existing wind farms in a simple and practical manner.

In a further preferred embodiment, the stabilization unit is further designed as described previously or hereinafter.

The stabilization unit is preferably set up to operate the wind farm on an electrical supply network with a low short circuit power, for example a short circuit power less than 10, preferably less than 8, particularly preferably less than 6, in particular further preferably less than 4, in particular less than 2.

In particular, it is thus proposed to design the components, such as the electrical storage device, for example, in such a way that the stabilization unit makes it possible to operate a wind farm of a specific nominal power at a network connection point with a specific short circuit power. For example, for this purpose, the electrical storage device has 10 percent of the nominal power of the wind farm in the case of a short circuit power of less than 8.

The electrical storage device of the stabilization unit has preferably been designed taking into account the wind farm nominal power and a distance between the stabilization unit and the wind farm or the wind farm transformer.

The electrical storage device preferably has at least 1 percent, preferably at least 5 percent, particularly preferably at least 10 percent, of the wind farm nominal power.

The stabilization unit is preferably set up to feed electrical active and reactive power into the electrical supply network and/or into the wind farm network and/or to extract it from the electrical supply network and/or from the wind farm network.

In a particularly preferred embodiment, the stabilization unit is further set up to feed electrical power into the electrical supply network and/or into the wind farm network and/or to extract it from the electrical supply network and/or from the wind farm network.

In particular, it is thus proposed that the stabilization unit can be operated in a four-quadrant operation. This means that the stabilization unit can act as both a consumer and a producer with regard to active and reactive power. For example, the stabilization unit can feed electrical reactive power into the electrical supply network and at the same time extract electrical active power from the electrical supply network.

The stabilization unit is preferably set up to support the electrical supply network by means of an active power frequency characteristic and/or a reactive power voltage characteristic.

In particular, it is thus proposed that both the inverter and the control unit are set up to be operated by means of an active power frequency characteristic and/or a reactive power voltage characteristic, in particular in such a way that the electrical supply network is supported, preferably by means of a feed-in of active and/or reactive power which corresponds to the characteristics.

For this purpose, the control unit has a register in which the characteristics are stored, for example. These characteristics can then be activated when required, for example by a grid operator or a wind farm control unit.

In a particularly preferred embodiment, the electrical storage device has at least 20 percent of the nominal power of the wind farm for this purpose. It has indeed been recognized that the electrical storage device must have a minimum size in order to assume other functions in addition to stabilizing the wind farm.

The wind power installations preferably operate in a substantially current impressing manner, in particular by means of a full converter.

It has indeed been further recognized that the stabilization unit results in no further voltage impressing generators being required in or near the wind farm.

In this case, it is particularly advantageous that, on the one hand, the stabilization unit can be retrofitted easily in wind farms which are already operating in a current impressing manner and, on the other hand, voltage impressing control methods can be dispensed with for wind farms which are yet to be built.

A stabilization unit, in particular for a wind farm, is further proposed which is designed as described previously or hereinafter.

BRIEF DESCRIPTION OF THE SEVERAL VIEWS OF THE DRAWINGS

The present invention is explained in greater detail hereinafter by way of example using exemplary embodiments with reference to the accompanying figures.

DETAILED DESCRIPTION

Figure 1:
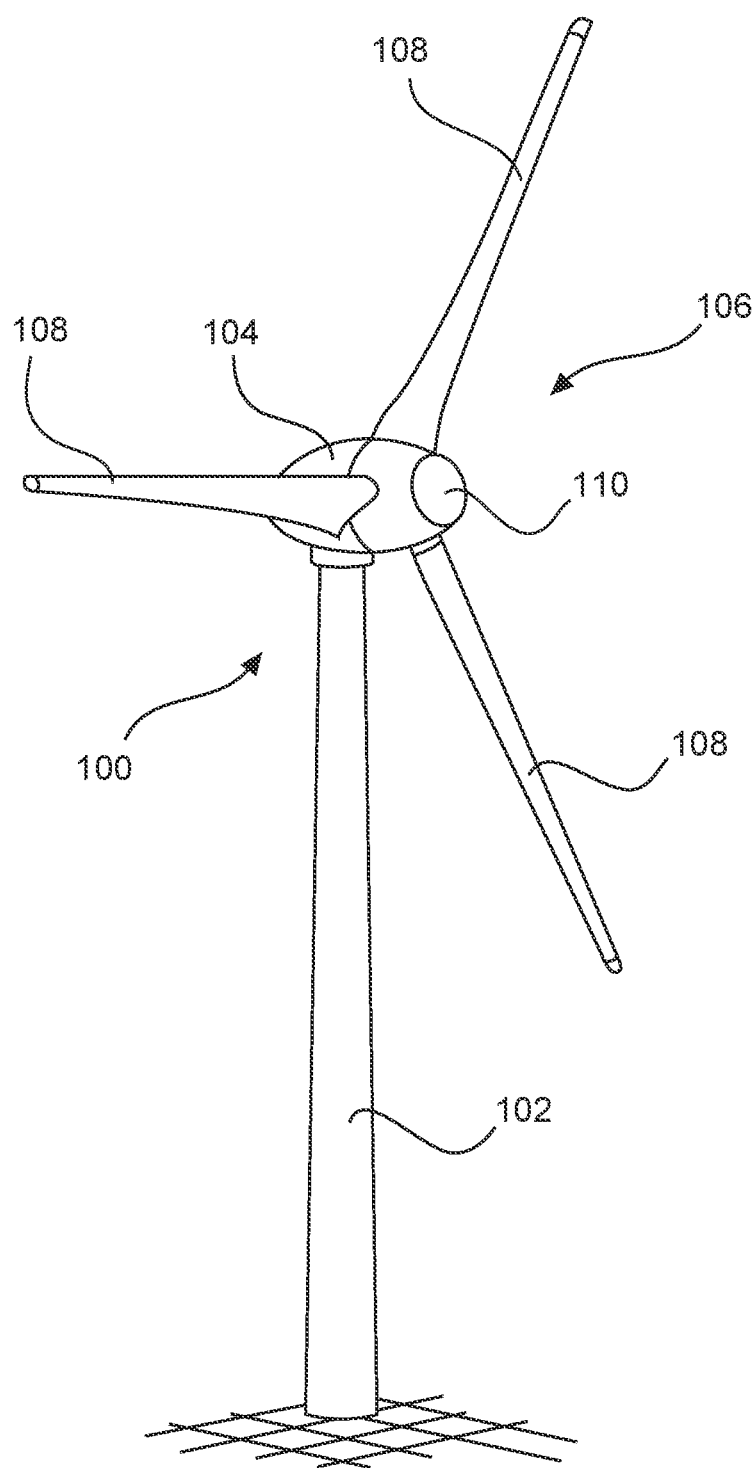
FIG. 1 shows a schematic view of a wind power installation of a wind farm.
Figure 2:
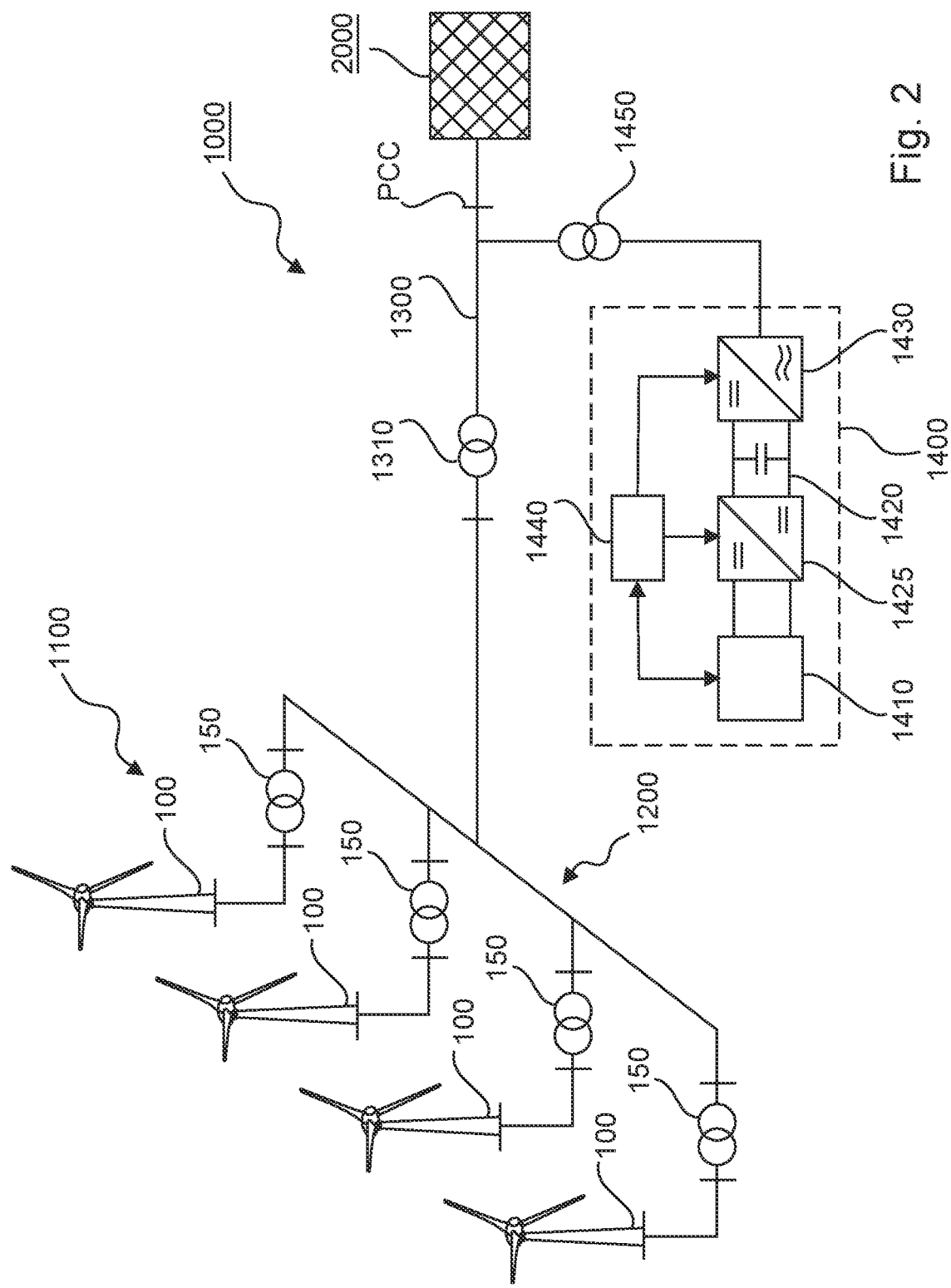
FIG. 2 shows a schematic structure of a wind farm in an embodiment.

FIG. 1 shows a wind power installation 100 of a wind farm, as shown in FIG. 2, for example.

The wind power installation 100 has a tower 102 and a nacelle 104 for this purpose. An aerodynamic rotor 106 with three rotor blades 108 and a spinner 110 is arranged on the nacelle 104. The rotor 106 is transferred into a rotational movement by the wind during operation and thus drives a generator in the nacelle 104. The generator thus generates a current which is provided to a wind power installation transformer by means of a full converter which operates in a current impressing manner, which wind power installation transformer is connected to a wind farm network.

FIG. 2 shows a schematic structure of a wind farm 1000 in an embodiment.

The wind farm 1000, which has a wind farm nominal power, is connected to an electrical supply network 2000 at the network connection point PCC for feeding electrical power by means of a connecting line 1300 having a wind farm transformer 1310.

For this purpose, the wind farm 1000 comprises a plurality of wind power installations 1100, for example four wind power installations 100, as preferably shown in FIG. 1.

The wind power installations 100 are each designed in a current impressing manner and are connected to one another via transformers 150 with a wind farm network 1200 which connects the plurality of wind power installations 1100.

For stabilizing the wind farm 1000, a stabilization unit (device) 1400 is further provided which is connected to the connecting line 1300 near the network connection point PCC by means of a transformer 1450.

The stabilization unit 1400 comprises an electrical storage device (battery) 1410, a direct voltage intermediate circuit 1420 with a DC-DC converter 1425, an inverter 1430 and a control unit (controller) 1440.

The electrical storage device 1410 is set up to provide an electrical power, for example 10 percent of the wind farm nominal power.

By means of a DC-DC converter 1425, the direct voltage intermediate circuit 1420 is connected to the electrical storage device 1410 and further connected to the inverter 1430. In addition, the direct voltage intermediate circuit 1420 is set up to conduct at least the electrical power provided by the electrical energy storage device 1410. Furthermore, the direct voltage intermediate circuit 1420 preferably has a filter with LCL characteristics.

The inverter 1430 is connected to the direct voltage intermediate circuit 1420 and is further connected to the transformer 1450. In addition, the inverter 1430 is set up to form at least the electrical power provided by the electrical storage device 1410 via the direct voltage circuit 1420.

The control unit 1440 is preferably connected to the electrical storage device 1410, the DC-DC converter 1425 and the inverter 1430. In addition, the control unit 1440 is at least set up to control the inverter 1430 in such a way that the stabilization unit 1400 at the wind farm appears, statically as well as dynamically, like an electromechanical synchronous machine.

The stabilization unit 1400 is thus preferably designed in a voltage impressing manner and is operated like a virtual synchronous machine.

In this case, the stabilization unit 1400, in particular the control unit 1440 and the electrical storage device 1410, are further preferably designed in such a way that the wind farm 1000 can be operated on an electrical supply network with a low short circuit power.

For this purpose, the electrical storage device 1410 is preferably designed taking into account the wind farm nominal power and the distance between the stabilization unit 1400 and the wind farm 1000, in particular taking into account the network impedance between the wind farm transformer 1310 and the stabilization unit 1400.

In addition, the stabilization unit 1400 is set up to feed electrical power into the electrical supply network 2000 and/or into the wind farm network 1200 and/or to extract it from the electrical supply network 2000 and/or from the wind farm network 1200.

Furthermore, the stabilization unit 1400 is set up to support the electrical supply network 2000 by means of an active power frequency characteristic and/or a reactive power voltage characteristic.

Offered herein are a number of advantages which are listed hereinafter and are not exhaustive:

1. Increasing the stability of a wind farm which is connected to a weak network connection point can be realized by using the stabilization unit, the nominal power of which stabilization unit is less than 10% of the farm power. A particularly cost-effective alternative to that which is previously known is thus provided.

2. Owing to the fact that the stabilization unit is operated like a virtual synchronous machine, the power which is required for stabilizing the wind farm can be reduced many times over compared to known STATCOMs, for example. This results in the solution also being more cost effective than previously known alternatives.

3. In principle, the stabilization unit is prepared to fulfill system services and can also be set up for this in a simple manner by way of the aforementioned dimensioning and control.

4. Furthermore, the stabilization unit can be set up to be installed in so called containers. This means that it can be both easily transported and implemented in pre-existing wind farms.

The invention claimed is:

1. A wind farm, having a wind farm nominal power, for feeding electrical power into an electrical supply network, comprising:

a plurality of wind power installations;

an electrical wind farm network coupled to the plurality of wind power installations and coupled, at a network connection point via a wind farm transformer, to the electrical supply network; and a stabilization device coupled to the electrical wind farm network and arranged between the plurality of wind power installations and the electrical supply network, the stabilization device being configured to improve a stability of the wind farm, the stabilization device comprising:

a battery configured to provide battery electrical power;

a direct voltage intermediate circuit coupled to the battery and configured to transmit at least the battery electrical power;

an inverter coupled to the direct voltage intermediate circuit and configured to feed at least the battery electrical power provided by the battery via the direct voltage intermediate circuit; and a controller configured to control at least the inverter such that the stabilization device at the wind farm statically and dynamically emulates an electromechanical synchronous machine.

2. The wind farm as claimed in claim 1, wherein the stabilization device is configured to operate in a voltage impressing manner.

3. The wind farm as claimed in claim 1, wherein the stabilization device includes:

a DC-DC converter coupled between the battery and the direct voltage intermediate circuit.

4. The wind farm as claimed in claim 1, wherein the stabilization device is coupled at the network connection point between the wind farm transformer and the electrical supply network.

5. The wind farm as claimed in claim 1, wherein the stabilization device includes:

a transformer coupled at an output of the inverter and configured to transform a voltage of the at least the battery electrical power.

6. The wind farm as claimed in claim 1, wherein the stabilization device is configured to operate the wind farm coupled to the electrical supply network with a low short circuit power.

7. The wind farm as claimed in claim 1, wherein the battery is configured based on the wind farm nominal power and a distance between the stabilization device and the wind farm.

8. The wind farm as claimed in claim 1, wherein the battery is configured to store at least 1 percent of the wind farm nominal power.

9. The wind farm as claimed in claim 1, wherein the stabilization device is configured to feed the electrical power into the electrical supply network and/or into the wind farm network and/or extract power from the electrical supply network and/or from the wind farm network.

10. The wind farm as claimed in claim 1, wherein the stabilization device is configured to support the electrical supply network using an active power frequency characteristic and/or a reactive power voltage characteristic.

11. The wind farm as claimed in claim 1, wherein the plurality of wind power installations operate in a current impressing manner using a full converter.

12. The wind farm as claimed in claim 1, wherein the battery is configured to store at least 5 percent of the wind farm nominal power.

13. The wind farm as claimed in claim 1, wherein the battery is configured to store at least 10 percent of the wind farm nominal power.

14. A stabilization device for a wind farm, having a plurality of wind power installations, for coupling the wind farm to a wind farm network, the stabilization device comprising:

a battery configured to provide an electrical power;

a direct voltage intermediate circuit coupled to the battery and configured to transmit at least the electrical power provided by the battery;

an inverter coupled to the direct voltage intermediate circuit and configured to supply at least the electrical power provided by the battery via the direct voltage intermediate circuit; and a controller configured to control at least the inverter such that the stabilization device at the wind farm statically and dynamically emulates an electromechanical synchronous machine.

15. The stabilization device as claimed in claim 14, wherein the stabilization device is configured to operate in a voltage impressing manner.

16. The stabilization device as claimed in claim 14, comprising:

a DC-DC converter coupled between the battery and the direct voltage intermediate circuit.

17. The stabilization device as claimed in claim 14, comprising:

a transformer, coupled to an output of the inverter, configured to transform a voltage of the electrical power.

* * * * *